United States Patent
Karunaratne et al.

(10) Patent No.: US 12,515,721 B2
(45) Date of Patent: Jan. 6, 2026

(54) CONTROLLER AND METHOD FOR COUPLING VEHICLES OF A VEHICLE SYSTEM

(71) Applicant: Transportation IP Holdings, LLC, Norwalk, CT (US)

(72) Inventors: Milan Karunaratne, Orange, CA (US); James D. Brooks, Schenectady, NY (US); Amit Kenjale, West Melbourne, FL (US); Gnouma Diagana, Toronto (CA); Anthony D. Paul, Anchorage, AK (US)

(73) Assignee: Transportation IP Holdings, LLC, Norwalk, CT (US)

( * ) Notice: Subject to any disclaimer, the term of this patent is extended or adjusted under 35 U.S.C. 154(b) by 93 days.

(21) Appl. No.: 18/544,161

(22) Filed: Dec. 18, 2023

(65) Prior Publication Data

US 2024/0246587 A1 Jul. 25, 2024

Related U.S. Application Data

(60) Provisional application No. 63/481,267, filed on Jan. 24, 2023.

(51) Int. Cl.
| | |
|---|---|
| *B61L 27/10* | (2022.01) |
| *B61L 27/04* | (2006.01) |
| *B61L 27/30* | (2022.01) |
| *B61L 27/70* | (2022.01) |

(52) U.S. Cl.
CPC ............. *B61L 27/10* (2022.01); *B61L 27/04* (2013.01); *B61L 27/30* (2022.01); *B61L 27/70* (2022.01)

(58) Field of Classification Search
CPC .......... B61L 27/10; B61L 27/04; B61L 27/30; B61L 27/70; B61L 27/40; B61L 15/0081; B61L 15/0054
USPC ....................................... 701/19, 20
See application file for complete search history.

(56) References Cited

FOREIGN PATENT DOCUMENTS

| DE | 102006005207 A1 | 8/2007 | |
|---|---|---|---|
| WO | 2009089492 A1 | 7/2009 | |
| WO | WO 2011/059817 A3 * | 5/2011 | .......... B61L 15/0058 |

OTHER PUBLICATIONS

European Search Report dated Jun. 6, 2024 for corresponding European Patent Application No. 24151376.1.

* cited by examiner

*Primary Examiner* — Hai H Huynh
(74) *Attorney, Agent, or Firm* — K&L Gates LLP

(57) ABSTRACT

A system that includes a controller that may receive one or more input characteristics related to upcoming movement of a group of vehicles, the one or more input characteristics indicative of an amount of energy needed to move the group of the vehicles along a segment of a route. The controller may also calculate a threshold range of tractive effort needed to move the group of the vehicles along the segment of the route based on the one or more characteristics and to monitor the tractive effort expended by a propulsion-generating vehicle of the vehicles in the group to move one or more of the vehicles in the group, and determine whether the vehicles in the group are coupled with each other or whether two or more of the vehicles are not coupled with each other based on the tractive effort that is monitored and the threshold range.

20 Claims, 5 Drawing Sheets

CONTROLLER AND METHOD FOR COUPLING VEHICLES OF A VEHICLE SYSTEM

CROSS-REFERENCE TO RELATED APPLICATIONS

This application claims priority to U.S. Provisional Application No. 63/481,267 (filed 24 Jan. 2023), the entire disclosure of which is incorporated herein by reference.

BACKGROUND

Technical Field

The subject matter described relates to a system and method for automatically coupling vehicles of a vehicle system.

Discussion of Art

Vehicle systems such as rail vehicles may include numerous individual vehicles that each couple together to form the vehicle system. In one example, a locomotive, or propulsion vehicle can couple to numerous non-propulsion vehicles. For example, a locomotive can couple to a "cut of cars" that can include in various examples different numbers of cars. To provide the coupling, currently the engineer or operator on the propulsion vehicle plays a vital role in determining the integrity of the initial coupling between the propulsion vehicle and a non-propulsion vehicle. The operator often must utilize feel or visual verification that the initial coupling is established. As the initial coupling is made, the operator may assume in an example of coupling to the first car in a cut of ten cars that the remaining nine cars are coupled to each other successfully. As the operator starts to pull away, they must either feel that all the non-propulsion vehicles are properly coupled or utilize visual verification of the final non-propulsion vehicle moving as the propulsion vehicle moves. Only then is verification provided that the appropriate coupling has occurred.

Using this methodology, human error can cause a vehicle, or vehicles, to be left behind because of improper coupling. For example, if a final vehicle of a vehicle system does not couple properly, an operator may not feel the difference between having a vehicle system with ten vehicles verses having one with nine vehicles. To this end, the operator can forget to check for visual confirmation that the final vehicle is moving, or alternatively can mistakenly believe that a next to last vehicle that is moving is the last vehicle of the vehicle system. In addition, autonomous vehicles simply do not have a driver to make such verifications.

For autonomous vehicles there are systems in place where the initial coupling between a propulsion vehicle and first non-propulsion vehicle is provided via visual inspection technologies mounted on the vehicle to determine if initial coupling was established. This visual equipment can be expensive and may require additional maintenance. In addition, there is no way for accounting if the coupling fails between two non-propulsion vehicles of the vehicle system. As a result, a need exists for improved verification of coupling during a coupling process between vehicles in a vehicle system.

BRIEF DESCRIPTION

In one or more embodiments, a system is provided that includes a controller that may receive input characteristics related to upcoming movement of a group of vehicles, the input characteristics indicative of an amount of energy needed to move the group of the vehicles along a segment of a route. The controller may be configured to determine one or more tractive efforts associated with one or more speeds or rates of energy consumption by one or more propulsion-generating vehicles of the vehicles in the group, the one or more tractive efforts determined based on the input characteristics. The controller may also compare (a) expended tractive effort generated by the one or more propulsion-generating vehicles in the group to move one or more of the vehicles in the group with (b) the one or more tractive efforts to determine whether the vehicles in the group are coupled with each other or whether two or more of the vehicles are not coupled with each other based on the tractive effort that is monitored and the threshold range.

In one or more embodiments, a system is provided that includes a controller that may receive one or more input characteristics related to upcoming movement of a group of vehicles, the one or more input characteristics indicative of an amount of energy needed to move the group of the vehicles along a segment of a route. The controller may also calculate a threshold range of tractive effort needed to move the group of the vehicles along the segment of the route based on the one or more characteristics and to monitor the tractive effort expended by a propulsion-generating vehicle of the vehicles in the group to move one or more of the vehicles in the group. The controller may also determine whether the vehicles in the group are coupled with each other or whether two or more of the vehicles are not coupled with each other based on the tractive effort that is monitored and the threshold range.

In one or more embodiments, a method is provided that includes obtaining one or more input characteristics related to upcoming movement of a group of vehicles, the one or more input characteristics indicative of an amount of energy needed to move the group of the vehicles along a segment of a route. The method may also include calculating a threshold range of tractive effort needed to move the group of the vehicles along the segment of the route based on the one or more characteristics and to monitor the tractive effort expended by a propulsion-generating vehicle of the vehicles in the group to move one or more of the vehicles in the group, and determining whether the vehicles in the group are coupled with each other or whether two or more of the vehicles are not coupled with each other based on the tractive effort that is monitored and the threshold range.

BRIEF DESCRIPTION OF THE DRAWINGS

The inventive subject matter may be understood from reading the following description of non-limiting embodiments, with reference to the attached drawings, wherein below.

DETAILED DESCRIPTION

Provided is a controller that can be used by an operator, or by an autonomous (un-maned) vehicle, that can determine couple integrity between a group of vehicles of a vehicle system as a propulsion vehicle moves after the coupling process. The controller obtains input characteristics related to upcoming movement of the group of vehicles such as weight, length, load, vehicle type, track conditions or the like. The input characteristics can be indicative of an amount of energy needed to move the group of the vehicles along a segment of a route. In this manner, the controller can determine the expected energy consumption, vehicle system speed, or other tractive effort based on the load provided. The controller can also monitor the actual energy consumption, vehicle speed, or the like to ensure the vehicle stays within determined thresholds. If the vehicle speed, energy consumption, etc. falls outside the determined thresholds, an indication is provided that improper coupling has occurred, and the propulsion vehicle needs to reattempt the coupling process. Such determination is made without the need for "human feel" or the ability to do dynamic visual inspections, thus eliminating human error and allowing for use by an autonomous vehicle system. In addition, the controller accomplishes the improved coupling process without the need for expensive visual equipment or sensors.

Figure 1:
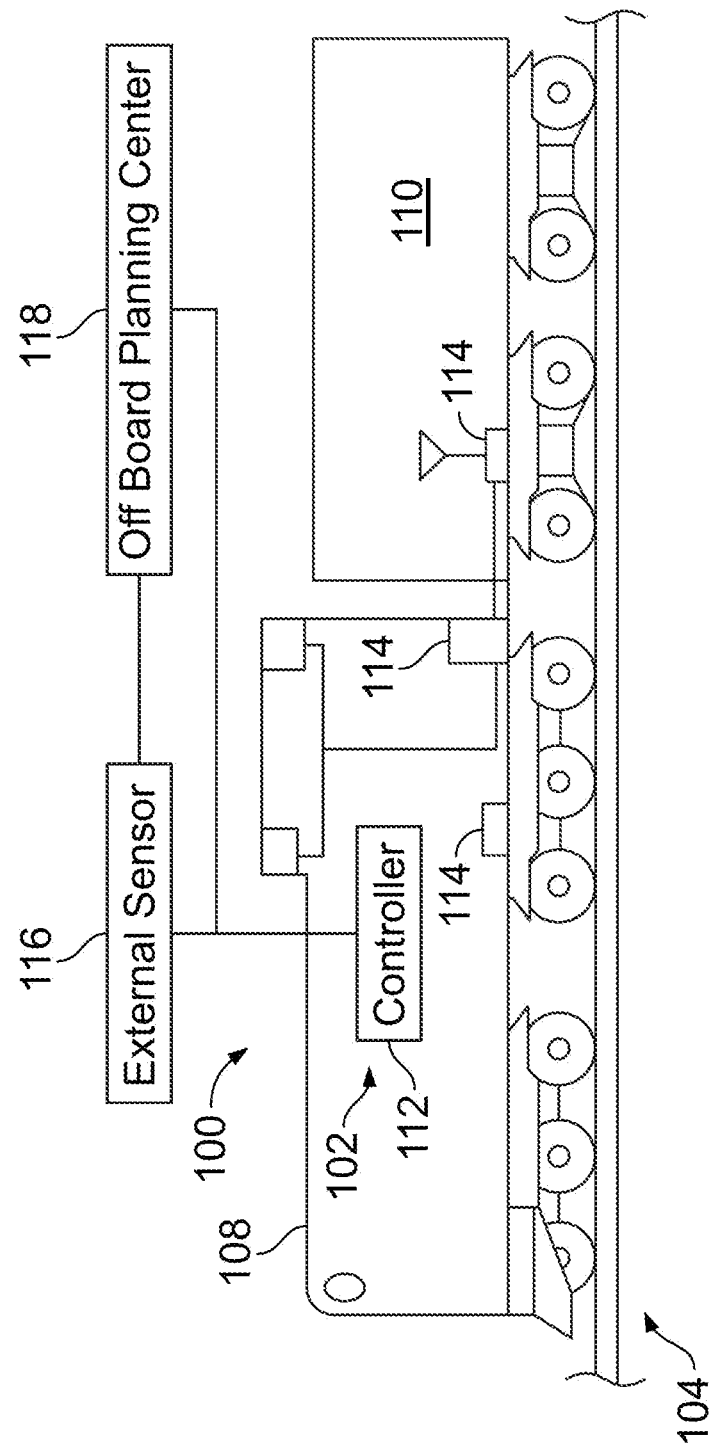
FIG. 1 illustrates block schematic diagram of a vehicle system.

FIG. 1 illustrates a schematic diagram of one example of a vehicle system 100 in accordance with an embodiment of the invention. FIG. 1 shows a vehicle system that is a rail vehicle. In other embodiments, a suitable vehicle system can be an off-road vehicle, an automobile, a construction vehicle, an agricultural vehicle, a mining vehicle, marine vessel, an off-highway vehicle, rail vehicles, trucks, trailers, mining vehicles or the like. The vehicle system may include a single vehicle or may include two or more vehicles. The vehicle system may travel along a route 104 on a trip from a starting or departure location to a destination or arrival location. In the illustrated example, the vehicle system may include a propulsion-generating vehicle 108 and a non-propulsion-generating vehicle 110. Yet in other examples, only a propulsion-generating vehicle, or propulsion-generating vehicles are provided. In the propulsion-generating vehicle and non-propulsion-generating vehicle example, vehicles may be mechanically interconnected to one another to travel together along the route. In another embodiment, the vehicles in the vehicle system may be logically or virtually coupled together, but not mechanically coupled together. For example, the vehicles may communicate with each other to coordinate their movements so that the vehicles move together as a convoy, platoon, swarm, fleet or consist without the vehicles being mechanically coupled with each other by couplers.

The vehicle system may also include a controller 112 that includes one or more processors, a memory, transceiver, etc. The controller may communicate with one or more internal sensors 114 internal to, or on the vehicle, and one or more external sensors 116 exterior to the vehicle. In example embodiments the internal sensors may be wheel sensors, temperature sensors, pressure sensors, load sensors, cameras, digital cameras, or the like. The external sensors may be temperature sensors, pressure sensors, cameras, digital cameras, wayside optical sensors and other sensors at a wayside device, sensors on another vehicle system, or the like. In addition, the controller may be in communication with a remote device, such as an off-board planning center 118. The off-board planning center in one example may be at a location where determinations are made related to the makeup of rail vehicles, routes rail vehicles will undertake, cargo needed to be moved by rail vehicles, or the like. In one example, the off-board planning center is considered a back office.

Figure 2A:
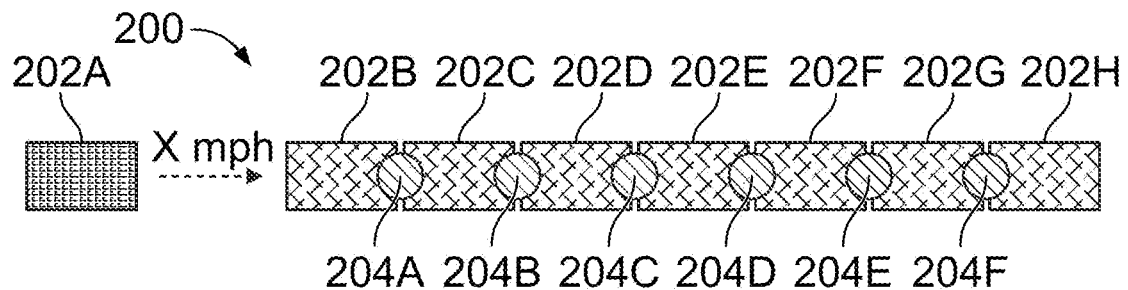
FIG. 2A illustrates a top schematic view of a vehicle system during a coupling process.
Figure 2B:
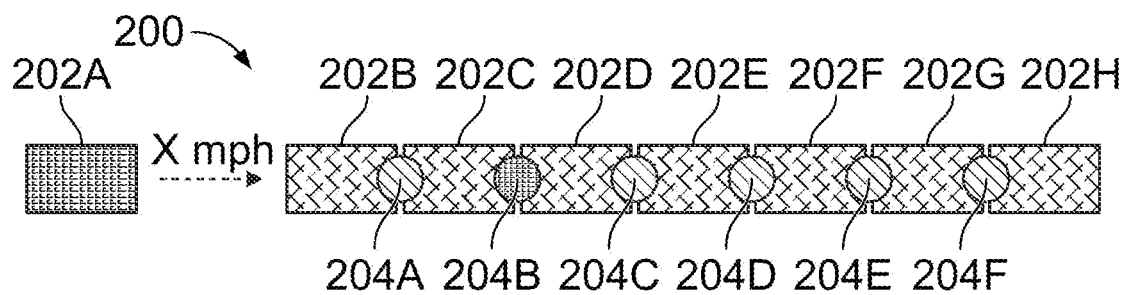
FIG. 2B illustrates a top schematic view of a vehicle system during a coupling process.
Figure 2C:
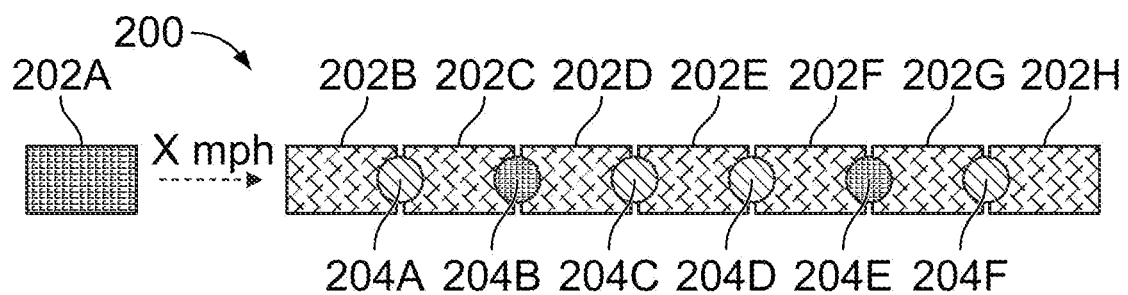
FIG. 2C illustrates a top schematic view of a vehicle system during a coupling process.

FIGS. 2A-2C illustrate overhead schematic views of a vehicle system 200 that include numerous individual vehicles 202A-202H that couple together at couplings 204A-204F. As illustrated in the different vehicle systems, successful coupling may be between all the individual vehicles when a propulsion, or lead, vehicle couples to the other vehicles of the vehicle system. The other vehicles may include non-propulsion vehicles, additional propulsion vehicles, a mix of non-propulsion and additional propulsion vehicles, etc. In the example of FIG. 2A the vehicles are all appropriately coupled to one another such that once the propulsion vehicle is coupled to the first non-propulsion vehicle, a successful coupling can occur. FIG. 2B illustrates where one coupling is not appropriately provided, while FIG. 2C illustrates where two couplings are not appropriately provided. To this end, typical methods such as feel, or checking the coupling between the propulsion vehicle and the first non-propulsion vehicle would be ineffective at determining that a proper coupling is not presented in the vehicle systems of FIGS. 2B and 2C.

Figure 3:
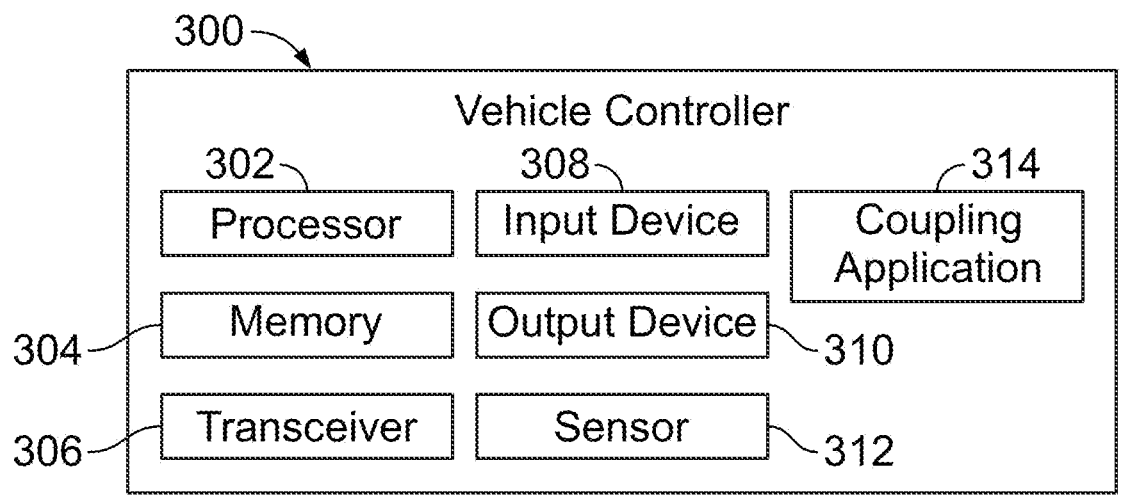
FIG. 3 illustrates a block schematic diagram of a controller.

FIG. 3 provides a schematic illustration of a controller 300 that may control operation of the propulsion-generating vehicle. In one example, the controller represents a controller one of the vehicle systems in FIGS. 1 and 2C. The controller may be a device that includes one or more processors 302 (microprocessors, integrated circuits, field programmable gate arrays, etc.) that perform the operations of the controller, as described herein.

The controller optionally may include a tangible and non-transitory computer readable memory 304, which may be an electronic, computer-readable storage device or medium. The memory may be within the housing of the controller, or alternatively may be on a separate device that may be communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

The controller may include a transceiver 306. The transceiver may be a single unit or be a separate receiver and transmitter. In one example, the transceiver may only transmit signals. In another example, the transceiver may obtain data from remote devices. In an example, the transceiver may obtain route data from a route database, such as a track database. The transceiver can also be utilized to receive input characteristics from a remote device. In one example, the remote device can be an off-board planning center that includes information such as vehicle system weight, the weight of each individual vehicle of the vehicle system, the indication of cargo or no cargo with a vehicle of the vehicle system, the weight of cargo within a vehicle system, information and data related to the weight of cargo within a vehicle of the vehicle system including cargo makeup, weight, density, volume, area, or the like, total weight of all vehicles expected to be moved, types of coupled vehicles, friction data or information related to each vehicle of the vehicle system, movement path along which the coupled vehicles can be pulled, grade of the path, curvature of the path, weather conditions (e.g. a wet or icy route may require more effort to move than dry conditions), wind direction, wind speed, other wind conditions, route health, debris located on the route, including leaves, precipitation, mud, etc., obstructions in the path, amount of vehicles in the vehicle system, or the like.

The controller may include an input device 308 and an output device 310. Specifically, the input device may be an interface between an operator, robot, or the like and the one or more processors. The input device may include a display or touch screen, input buttons, ports for receiving memory devices, etc. In this manner, an operator may manually provide parameters into the controller, including vehicle parameters, route parameters, and trip parameters. In one example, the input characteristics may be input into the controller via the input device.

The output device may present information and data to an operator or provide prompts for information and data. The output device may similarly be a display or touch screen. In this manner, a display or touch screen may be an input device and an output device.

The vehicle system may include one or more sensors 312. In one example, at least one of the sensors obtains an input characteristic. To this end, the sensor may be a pressure sensor, temperature sensor, haptic season, radar for determining weather conditions, speed sensor, wheel sensor that measures the rotational speed of a wheel or axle, fuel level sensor, torque sensor, coupling sensor that indicates whether coupling has occurred, camera, digital camera, or the like. In one example, each coupled vehicle can have a sensor that reports back to the pulling/pushing vehicle (e.g., propulsion vehicle) to verify that all the vehicles of the vehicle system are coupled and moving together. In other examples, the one or more sensors can provide input characteristics that are related to the load of the vehicle system, the rate of energy consumption of the vehicle system, the speed of the vehicle system, or the like.

In other example embodiments the one or more sensors may by external to the vehicle system and provide external verification. For example, a sensor can be provided that may provide input characteristics that include whether all the vehicles of the vehicle system are moving. To this end, the one or more sensors may be a camera, digital camera, etc., including on a drone or other unmanned ariel vehicles, other vehicle, wayside devices such as wayside optical sensors, or the like. In one example, the controller may receive input characteristics as including one or more of a first output from a wayside optical sensor, a second output from an unmanned aerial vehicle, a third output from a second group of vehicles (e.g., second vehicle system) moving by the vehicle system, or manual input from an operator of the vehicle system.

The controller also includes a coupling application 314 that includes instructions that may be utilized by the one or more processors for determining whether a lead vehicle and other vehicles of a vehicle system have coupled together during a coupling process. The coupling application may be stored in the memory, or the instructions associated with the location application may be stored in the memory. Alternatively, the coupling application may be at a remote device and in communication with the controller. The coupling application can include instructions that direct at least some operations of the controller.

The coupling application may include instructions to compare an expended tractive effort generated by the one or more propulsion-generating vehicles in a group of vehicles of a vehicle system to move one or more of the vehicles in the group with the one or more tractive efforts to determine whether the vehicles in the group are coupled with each other or whether two or more of the vehicles are not coupled with each other based on the tractive effort that is monitored and the threshold range. To accomplish, the coupling application may include instructions for the controller to determine the load of the vehicle system and the related expected tractive effort the propulsion vehicle will have to achieve to move the vehicle system. To this end, the coupling application may determine an amount of energy needed to move a group of the vehicles along a segment of a route. Based on this determination, the coupling application may identify upper and lower thresholds that are related to a vehicle parameter such as the speed of the vehicle, the rate of energy consumption of the vehicle or the like.

The coupling application has the controller monitor the vehicle system after the coupling to determine if the vehicle system is operating between the upper and lower thresholds. If a vehicle is not coupled, the vehicle system will move faster, consume energy at a slower rate, or the like to achieve the expected tractive effort. As a result, a threshold is reached, providing the indication that proper coupling is not presented. As soon as the threshold is exceeded or passed, the coupling application causes the controller to stop the movement of the vehicle system, and to reverse to attempt to again couple together all the vehicles of the vehicle system.

Figure 4A:
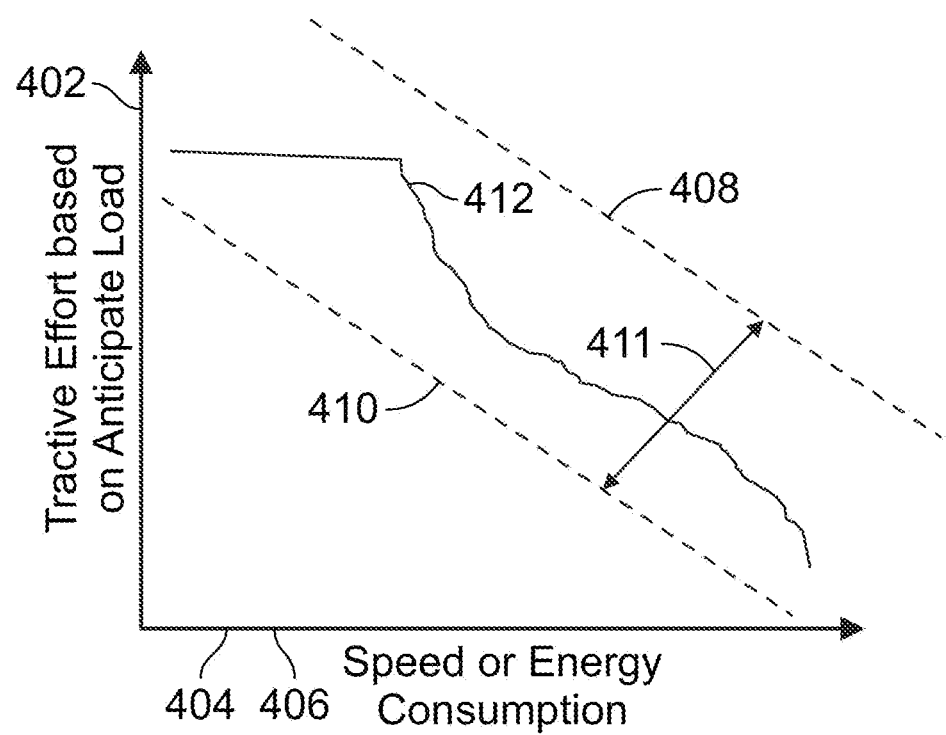
FIG. 4A illustrates a graph of tractive effort based on expected load verses speed or energy consumption.
Figure 4B:
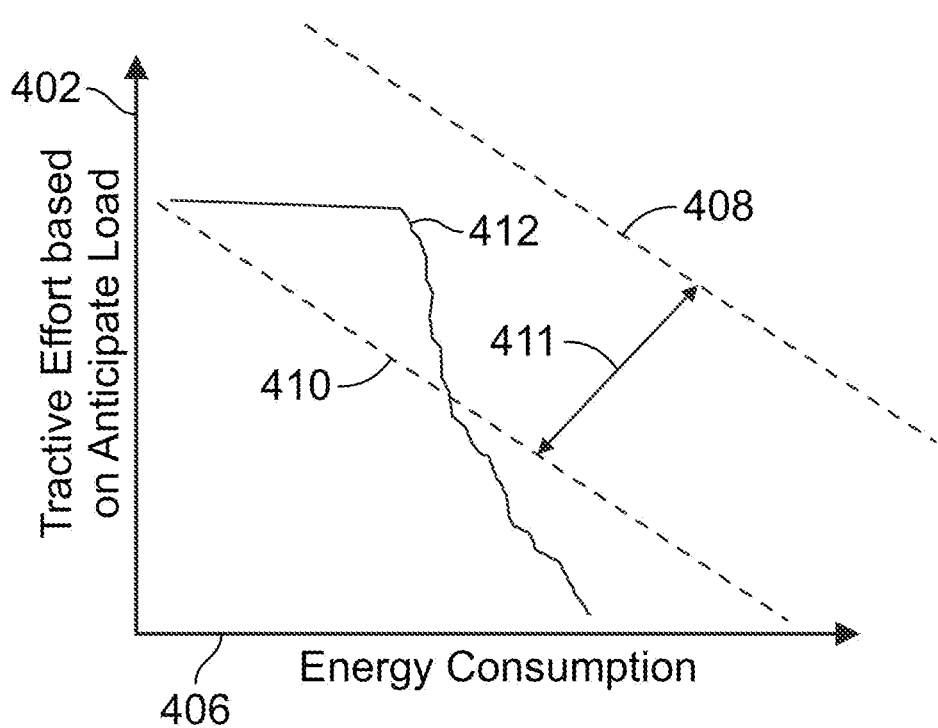
FIG. 4B illustrates a graph of tractive effort based on expected load verses energy consumption.
Figure 4C:
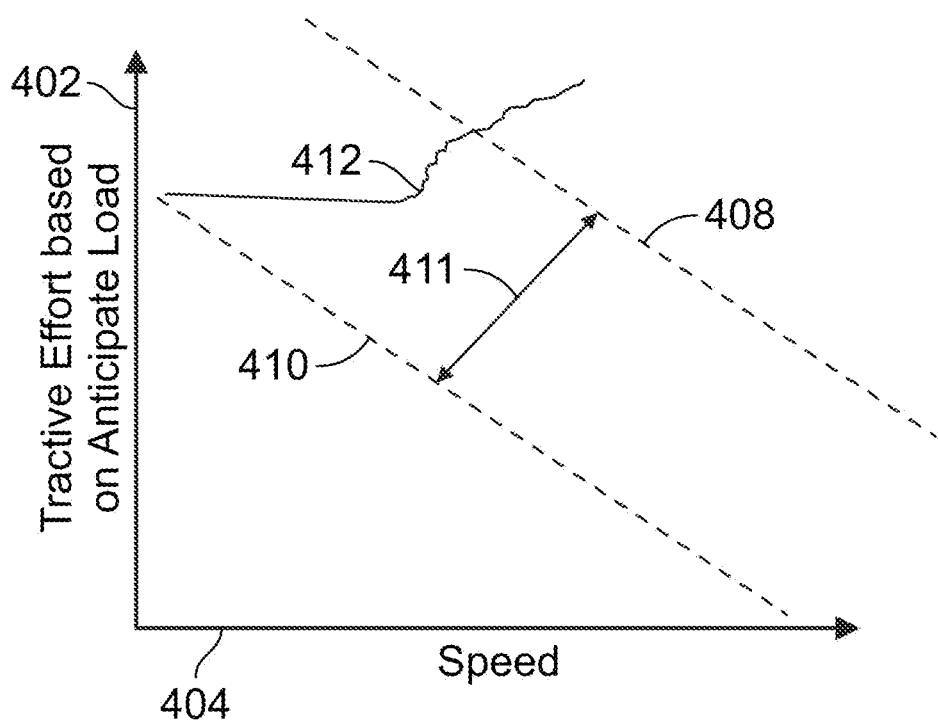
FIG. 4C illustrates a graph of tractive effort based on expected load verses speed.

FIGS. 4A-C illustrate graphs of tractive effort based on expected load 402 verses either speed 404 or rate of energy consumption 406 that is determined by the coupling application. As illustrated, an upper, or first threshold 408 and a lower, or second threshold 410 are determined based on the expected load to form a threshold range 411. FIG. 4A illustrates an example of when the vehicle system has successfully coupled all the vehicles of the vehicle system, with the movement 412 of the vehicle system staying within the threshold range between the first and second thresholds. Meanwhile, FIGS. 4B and 4C show examples of when the vehicle system operates outside of a threshold because of the speed (FIG. 4B), or rate of energy consumption (FIG. 4C) being exceeded. When exceeded as shown in FIGS. 4B and 4C, the controller stops the movement of the vehicle system so that the vehicle system can reattempt to couple to all the vehicles of the vehicle system.

In one example, the coupling application includes artificial intelligence (AI) algorithm to continuously, in real-time determine the first and second thresholds utilized based on input characteristics received from sensors. As used herein real-time shall mean at the same time, or a time substantially contemporaneous, with an occurrence of another event or action. For the avoidance of doubt, as an example, when a threshold range is determined in real-time, the determination is provided within a few seconds obtaining the input characteristics. Similarly, when the determination that a speed, rate of energy consumption, or the like is made in real-time, it is made within a second or two seconds of the movement of the vehicle system after coupling. In an example, the coupling application can obtain dynamic input characteristics such as weather conditions (e.g. amount of ice, precipitation, etc.), route or path information such as whether debris, mud, snow, water, leaves, or the like is located in or one a pathway, route, track, etc., real-time weight or load information from individual vehicles (e.g. weight sensors may be utilized to determine when additional cargo, passengers, operators, etc. are on a vehicle that is different than previously provided by a remote controller such as a planning system), engine efficiency, fuel level, fuel weight, or the like. Each of these inputs represent variables that may continuously and dynamically change over time. In this manner, the AI algorithm can continuously obtain numerous changing variables from numerous sensors, inputs, etc. and in real-time dynamically change or adjust the first and second thresholds by determining the expected tractive effort based on the load, and speed, rate of energy consumption, etc. expected to achieve or be achieved by the tractive effort. Such calculations are continuously made in real-time and are calculations that could not be made by a human in a similar time frame, far less continuously made as the vehicle system moves.

In one example, when coupling is determined to not be successful, the coupling application may determine a speed, or vehicle characteristics required to successfully couple to all the vehicles in the vehicle system. In one example, the coupling application includes an internal assessment engine that in one embodiment utilizes an AI algorithm to determine how to ensure a next attempt to couple the vehicles of the vehicle system together is successful. For example, determinations that may be made include determining the vehicles that did not couple together, determining the speed at which to reverse into an uncoupled vehicle, the direction or alignment of the lead vehicle and vehicles coupled to the lead vehicle, or the like. In this manner, the coupling application utilizes input characteristics, initial coupling characteristics such as initial coupling speed, alignment, or the like to determine a speed, alignment, etc. to operate the propulsion vehicle to couple to the uncoupled vehicle(s). In this manner, the chance of appropriate coupling on a second attempt is increased.

Figure 5:
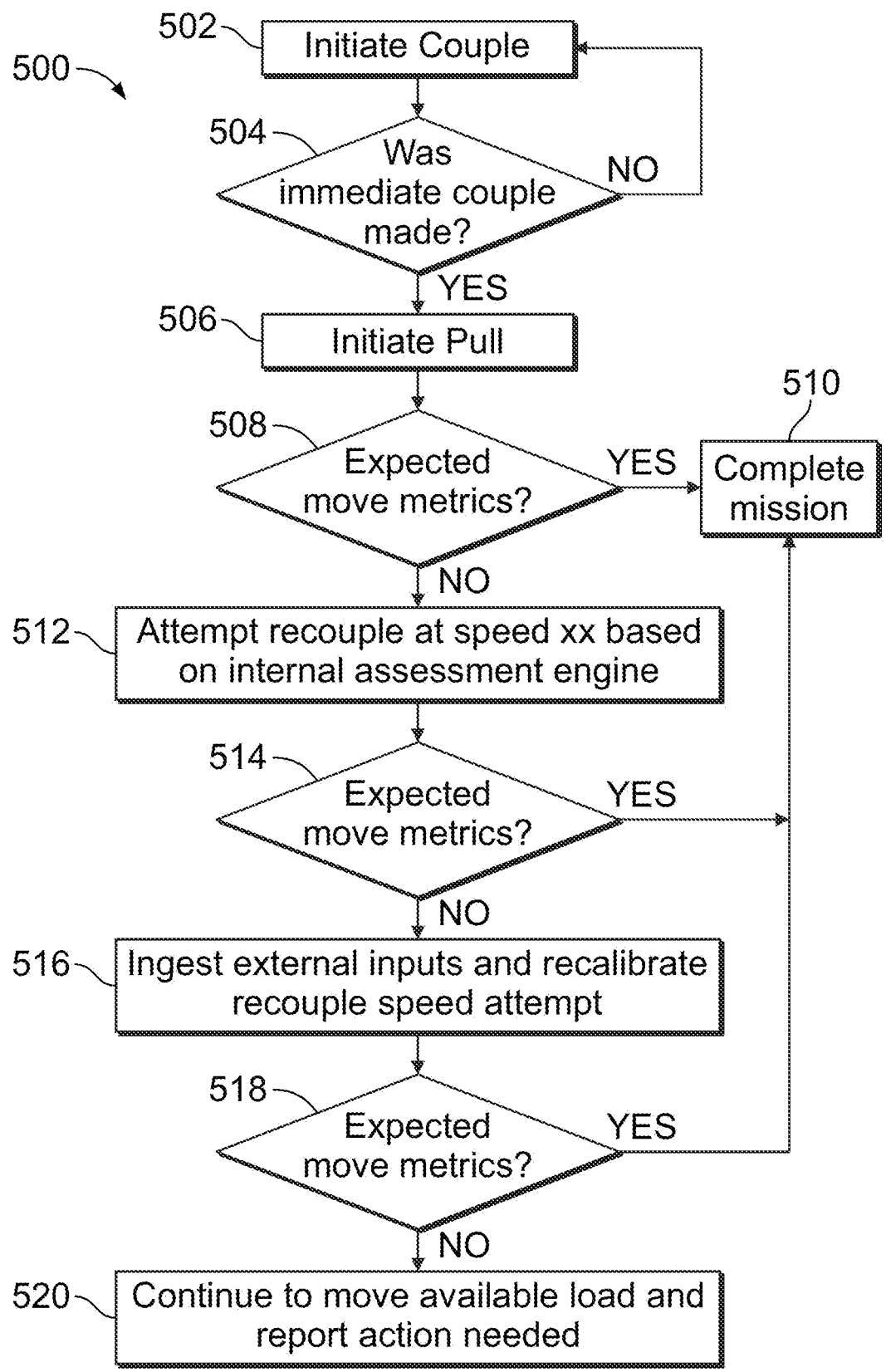
FIG. 5 illustrates a schematic flow block diagram for a process for determining coupling of vehicles in a vehicle system during a coupling process.

FIG. 5 illustrates a schematic flow block diagram for a process 500 of determining whether all the vehicles of a vehicle system have been coupled together during a coupling process. In one example, the vehicle systems and controllers of FIGS. 1-3 are utilized to perform the method. In one example, the coupling application of FIG. 3 provides instructions that may be utilized by one or more processors for implementing the process.

At step 502, a coupling between a lead vehicle and one or more secondary vehicles of a vehicle system may be initiated. The lead vehicle in one example may be a locomotive, or propulsion vehicle, of a rail vehicle. The secondary vehicles may include one or more non-propulsion vehicles that are each to be coupled to one another. In another example, the lead vehicle may be coupled to a combination of propulsion and non-propulsion vehicles, or to just propulsion vehicles. In one example, the coupling is initiated by the lead vehicle backing towards a group of vehicles, or cut of cars, such that a coupling device of the lead vehicle aligns with the coupling device of a secondary vehicle.

At step 504, optionally, a determination can be made whether an initial coupling has been made between the lead vehicle and a secondary vehicle. In one example, a coupling sensor such as a camera, digital camera, or the like can be utilized to visually show the coupling. In one example, a coupling application utilizes object sensing detection of a visual image to make the determination that the initial coupling has occurred. To this end, the initial determination may be an automatic determination that is not made by an operator. Alternatively, a pressure sensor, motion sensor, or the like may be used to automatically determine that an initial coupling between the lead vehicle and one of the secondary vehicles has occurred.

After the initial coupling, at step 506 an initial pull of the group of vehicles by the lead vehicle is provided. Once the initial pull begins, at step 508, a determination is made whether the speed, rate of energy consumption, other vehicle-based metrics, etc. are within an expected threshold range. In one example, a first threshold that is an upper, or maximum threshold for how the vehicle-based metric should perform, while a second threshold is a lower, or minimum threshold for how the vehicle-based metric should perform. To this end, the first threshold and second threshold form a threshold range in which a vehicle system is expected to operate. In one example, a vehicle-based metric may be vehicle system speed with the expected threshold range of speed based on the tractive effort and load provided is between 10 miles per hour (mph) (first, or upper threshold) and 5 mph (second, or lower threshold). In this manner, the threshold range is between 5 mph and 10 mph. If, based on this threshold range the vehicle operates at 7 mph, then the vehicle system is moving as expected, and appropriate couple is deemed to be provided. However, if the vehicle system is detected or determined to be operating at 15 mph and outside of the threshold range, then an indication is provided that at least one vehicle has not coupled to the vehicle system and has been left behind.

If at step 508 the determined vehicle metric stays within the first threshold and second threshold, an indication is provided that coupling occurred, and at step 510, the vehicle system can proceed accordingly. However, if the vehicle metric falls outside the threshold range, then at step 512 the controller may stop movement of the propulsion-generating vehicle responsive to determining that the two or more of the vehicles in the group are not coupled with each other. Then an attempt is made to recouple the lead vehicle with all the vehicles in the group to be in the vehicle system. To accomplish, a coupling application that includes an internal adjustment engine may be provided that obtains input characteristics related to the initial coupling attempt. The input characteristics can include the speed of the vehicle during the coupling attempt, the alignment of the vehicle during the coupling attempt, the location between vehicles where coupling did not occur, the current weather conditions, including wind conditions, route conditions including quality, presence of debris, water, snow, mud, etc., loading conditions of vehicles coupled compared to vehicle(s) that did not couple, or the like. In one example, machine learning, or an AI algorithm can be utilized where the AI algorithm utilizes numerous input characteristics compared to other similar situations to determine the speed, alignment, and/or other vehicle parameters and characteristics for coupling during the second attempt.

After a second attempt is made to couple the vehicles of the vehicle system together, at step 514 a determination is made again whether a vehicle characteristic is within a first threshold and second threshold. In one example, the first threshold and second threshold are determined utilizing dynamic variables such that the first threshold and second threshold of the initial attempt are different than the first threshold and second threshold of the second attempt. Alternatively, the first and second thresholds remain the same. Still, because the vehicle characteristics, such as vehicle speed, are determined using input characteristics, an improved opportunity of coupling is presented.

If the vehicle is within the threshold range, appropriate coupling is provided, and no further action is required. However, if the vehicle characteristics are not within the threshold range again, then at step 516 yet another attempt is made to couple the vehicles. Once again, determinations are made utilizing the most up to date input characteristics, and at step 518 another determination is made whether the vehicle metrics are within the threshold range. If so, appropriate coupling has occurred. If not, the recoupling attempt and determination steps are continuously repeated at step 520 until coupling of all the vehicles of the vehicle system is achieved. In one example, after a determined number of attempts, such as five, ten, twenty, etc. a prompt, communication, or the like may be provided to an operator, or to a remote location to allow a person to know that coupling has been repeatedly unsuccessful. Thus, a person should be called to verify that a faulty reading, faulty coupling device, or the like is not causing the continuous failures.

Thus, provided are a controller and method for improved coupling of vehicles of a vehicle system. The controller uses input characteristics to determine an expected load and traction effort. From this, a vehicle characteristic or metric such as expected vehicle speed, rate of energy consumption, or the like can be monitored to see if the vehicle system is behaving like a vehicle system with all vehicles appropriately coupled, or is behaving like a vehicle system where all the vehicles are not successfully coupled. This is accomplished without expensive monitoring equipment or the need for an operator to make any decisions. Therefore, expense is saved, while human error is eliminated. To this end, such a controller may be utilized with an autonomous vehicle. In addition, AI algorithms can be utilized to improve accuracy and improve performance of determination of incorrect coupling, and vehicle characteristics required in a second attempt to couple the vehicles of the vehicle system together.

In one or more example embodiments a system is provided that includes a controller that may receive input characteristics related to upcoming movement of a group of vehicles, the input characteristics indicative of an amount of energy needed to move the group of the vehicles along a segment of a route. The controller may be configured to determine one or more tractive efforts associated with one or more speeds or rates of energy consumption by one or more propulsion-generating vehicles of the vehicles in the group, the one or more tractive efforts determined based on the input characteristics. The controller may also compare (a) expended tractive effort generated by the one or more propulsion-generating vehicles in the group to move one or more of the vehicles in the group with (b) the one or more tractive efforts to determine whether the vehicles in the group are coupled with each other or whether two or more of the vehicles are not coupled with each other based on the tractive effort that is monitored and the threshold range.

The controller may receive the input characteristics from an off-board planning center. In one aspect, the controller may receive the input characteristics that may include one or more of an individual weight of one or more of the vehicles, a total weight of the vehicles in the group, or an indication of whether one or more of the vehicles is carrying cargo or not carrying cargo. The controller may receive the input characteristics that include one or more of a type of the vehicles in the group or an output from a coupling sensor. In one example, the controller may receive the input characteristics that include one or more of a grade of the segment of the route, a curvature of the segment of the route, a weather condition in an area where the segment of the route is located, a condition of the segment of the route, or a presence of debris or an obstruction on the route. In another example, the group is a first group, and the controller may receive the input characteristics that include one or more of a first output from a wayside optical sensor, a second output from an unmanned aerial vehicle, a third output from a second group of vehicles moving by the first group, or manual input from an operator of the group of the vehicles. In yet another example, the controller may stop movement of the propulsion-generating vehicle responsive to determining that the two or more of the vehicles in the group are not coupled with each other. Optionally, the vehicles in the group may be one or more of rail vehicles, automobiles, trucks, trailers, agricultural vehicles, or mining vehicles.

In one or more example embodiments a system is provided that includes a controller that may receive one or more input characteristics related to upcoming movement of a group of vehicles, the one or more input characteristics indicative of an amount of energy needed to move the group of the vehicles along a segment of a route. The controller may also calculate a threshold range of tractive effort needed to move the group of the vehicles along the segment of the route based on the one or more characteristics and to monitor the tractive effort expended by a propulsion-generating vehicle of the vehicles in the group to move one or more of the vehicles in the group. The controller may also determine whether the vehicles in the group are coupled with each other or whether two or more of the vehicles are not coupled with each other based on the tractive effort that is monitored and the threshold range.

The controller may receive the one or more input characteristics from an off-board planning center. In one aspect, the controller may receive the one or more input characteristics as including one or more of an individual weight of one or more of the vehicles, a total weight of the vehicles in the group, or an indication of whether one or more of the vehicles is carrying cargo or not carrying cargo. In another aspect, the controller may receive the one or more input characteristics as including one or more of a type of the vehicles in the group or an output from a coupling sensor. The controller may receive the one or more input characteristics as including one or more of a grade of the segment of the route, a curvature of the segment of the route, a weather condition in an area where the segment of the route is located, a condition of the segment of the route, or a presence of debris or an obstruction on the route. In one example, the group may be a first group, and the controller may receive the one or more input characteristics as including one or more of a first output from a wayside optical sensor, a second output from an unmanned aerial vehicle, a third output from a second group of vehicles moving by the first group, or manual input from an operator of the group of the vehicles. The controller may stop movement of the propulsion-generating vehicle responsive to determining that the two or more of the vehicles in the group are not coupled with each other. In yet another example, the vehicles in the group may be one or more of rail vehicles, automobiles, trucks, trailers, agricultural vehicles, or mining vehicles.

In one or more example embodiments, a method is provided that includes obtaining one or more input characteristics related to upcoming movement of a group of vehicles, the one or more input characteristics indicative of an amount of energy needed to move the group of the vehicles along a segment of a route. The method may also include calculating a threshold range of tractive effort needed to move the group of the vehicles along the segment of the route based on the one or more characteristics and to monitor the tractive effort expended by a propulsion-generating vehicle of the vehicles in the group to move one or more of the vehicles in the group, and determining whether the vehicles in the group are coupled with each other or whether two or more of the vehicles are not coupled with each other based on the tractive effort that is monitored and the threshold range.

The one or more input characteristics may be received as including one or more of an individual weight of one or more of the vehicles, a total weight of the vehicles in the group, an indication of whether one or more of the vehicles is carrying cargo or not carrying cargo, a type of the vehicles in the group, an output from a coupling sensor, a grade of the segment of the route, a curvature of the segment of the route, a weather condition in an area where the segment of the route is located, a condition of the segment of the route, or a presence of debris or an obstruction on the route. In one aspect, the group may be a first group, and the one or more input characteristics may be received as including one or more of a first output from a wayside optical sensor, a second output from an unmanned aerial vehicle, a third output from a second group of vehicles moving by the first group, or manual input from an operator of the group of the vehicles. In another aspect, the method may also include stopping movement of the propulsion-generating vehicle responsive to determining that the two or more of the vehicles in the group are not coupled with each other.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such claims are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a controller configured to receive input characteristics related to upcoming movement of a group of vehicles, the input characteristics indicative of an amount of energy needed to move the group of vehicles along a segment of a route;
the controller configured to determine one or more tractive efforts associated with one or more speeds or rates of energy consumption by one or more propulsion-generating vehicles of the vehicles in the group, the one or more tractive efforts determined based on the input characteristics; and
the controller configured to compare (a) expended tractive effort generated by the one or more propulsion-generating vehicles in the group to move one or more of the vehicles in the group during a coupling process with (b) the one or more tractive efforts to determine whether the vehicles in the group are coupled with each other or whether two or more of the vehicles are not coupled with each other by the coupling process.

2. The system of claim 1, wherein the controller is configured to receive the input characteristics from an off-board planning center.

3. The system of claim 1, wherein the controller is configured to receive the input characteristics as including one or more of an individual weight of one or more of the vehicles, a total weight of the vehicles in the group, or an indication of whether one or more of the vehicles is carrying cargo or not carrying cargo.

4. The system of claim 1, wherein the controller is configured to receive the input characteristics as including one or more of a type of the vehicles in the group or an output from a coupling sensor.

5. The system of claim 1, wherein the controller is configured to receive the input characteristics as including one or more of a grade of the segment of the route, a curvature of the segment of the route, a weather condition in an area where the segment of the route is located, a condition of the segment of the route, or a presence of debris or an obstruction on the route.

6. The system of claim 1, wherein the group is a first group, and the controller is configured to receive the input characteristics as including one or more of a first output from a wayside optical sensor, a second output from an unmanned aerial vehicle, a third output from a second group of vehicles moving by the first group, or manual input from an operator of the group of the vehicles.

7. The system of claim 1, wherein the controller is configured stop movement of the one or more propulsion-generating vehicles responsive to determining that the two or more of the vehicles in the group are not coupled with each other.

8. The system of claim 1, wherein the vehicles in the group are one or more of rail vehicles, automobiles, trucks, trailers, agricultural vehicles, or mining vehicles.

9. A system comprising:
a controller configured to receive one or more input characteristics related to upcoming movement of a group of vehicles, the one or more input characteristics indicative of an amount of energy needed to move the group of the vehicles along a segment of a route;
the controller configured to calculate a threshold range of tractive effort needed to move the group of the vehicles along the segment of the route based on the one or more input characteristics and to monitor the tractive effort expended by a propulsion-generating vehicle of the vehicles in the group to move one or more of the vehicles in the group; and
the controller configured to determine whether the vehicles in the group are coupled with each other or whether two or more of the vehicles are not coupled with each other based on the tractive effort that is monitored during a coupling process and the threshold range.

10. The system of claim 9, wherein the controller is configured to receive the one or more input characteristics from an off-board planning center.

11. The system of claim 9, wherein the controller is configured to receive the one or more input characteristics as including one or more of an individual weight of one or more of the vehicles, a total weight of the vehicles in the group, or an indication of whether one or more of the vehicles is carrying cargo or not carrying cargo.

12. The system of claim 9, wherein the controller is configured to receive the one or more input characteristics as including one or more of a type of the vehicles in the group or an output from a coupling sensor.

13. The system of claim 9, wherein the controller is configured to receive the one or more input characteristics as including one or more of a grade of the segment of the route, a curvature of the segment of the route, a weather condition in an area where the segment of the route is located, a condition of the segment of the route, or a presence of debris or an obstruction on the route.

14. The system of claim 9, wherein the group is a first group, and the controller is configured to receive the one or more input characteristics as including one or more of a first output from a wayside optical sensor, a second output from an unmanned aerial vehicle, a third output from a second group of vehicles moving by the first group, or manual input from an operator of the group of the vehicles.

15. The system of claim 9, wherein the controller is configured stop movement of the propulsion-generating vehicle responsive to determining that the two or more of the vehicles in the group are not coupled with each other.

16. The system of claim 9, wherein the vehicles in the group are one or more of rail vehicles, automobiles, trucks, trailers, agricultural vehicles, or mining vehicles.

17. A coupling method comprising:
obtaining one or more input characteristics related to upcoming movement of a group of vehicles, the one or more input characteristics indicative of an amount of energy needed to move the group of the vehicles along a segment of a route;
calculating a threshold range of tractive effort needed to move the group of the vehicles along the segment of the route based on the one or more input characteristics and to monitor the tractive effort expended by a propulsion-generating vehicle of the vehicles in the group to move one or more of the vehicles in the group; and
determining whether the vehicles in the group are coupled with each other or whether two or more of the vehicles are not coupled with each other based on the tractive effort that is monitored and the threshold range.

18. The coupling method of claim 17, wherein the one or more input characteristics are received as including one or more of an individual weight of one or more of the vehicles, a total weight of the vehicles in the group, an indication of whether one or more of the vehicles is carrying cargo or not carrying cargo, a type of the vehicles in the group, an output from a coupling sensor, a grade of the segment of the route, a curvature of the segment of the route, a weather condition in an area where the segment of the route is located, a condition of the segment of the route, or a presence of debris or an obstruction on the route.

19. The coupling method of claim 17, wherein the group is a first group, and the one or more input characteristics are received as including one or more of a first output from a wayside optical sensor, a second output from an unmanned aerial vehicle, a third output from a second group of vehicles moving by the first group, or manual input from an operator of the group of the vehicles.

20. The coupling method of claim 17, further comprising: stopping movement of the propulsion-generating vehicle responsive to determining that the two or more of the vehicles in the group are not coupled with each other.

* * * * *